US006736529B1

(12) United States Patent
Lee (10) Patent No.: US 6,736,529 B1
(45) Date of Patent: May 18, 2004

(54) LIGHT DEVICE FOR ATTACHING TO VARIOUS OBJECTS

(76) Inventor: Wen Sung Lee, 8F-2, No. 60-2, Gong Yeh 1st Road, Hsitun Dist., Taichung (TW), 407

( * ) Notice: Subject to any disclaimer, the term of this patent is extended or adjusted under 35 U.S.C. 154(b) by 0 days.

(21) Appl. No.: 10/438,439

(22) Filed: May 14, 2003

(51) Int. Cl.[7] ............................................. F21V 21/084
(52) U.S. Cl. ...................... 362/287; 362/105; 362/269
(58) Field of Search ................................. 362/103, 105, 362/106, 269, 285, 287, 427, 800

(56) References Cited

U.S. PATENT DOCUMENTS 4,298,913 A * 11/1981 Lozar .......................... 362/105
4,654,757 A * 3/1987 Birkhauser ................... 362/287
D405,202 S * 2/1999 Fattori et al. ................ 362/103

* cited by examiner

*Primary Examiner*—Y My Quach Lee
(74) *Attorney, Agent, or Firm*—Charles E. Baxley (57) ABSTRACT

A light device includes a base having two spaced flaps, a housing disposed between the flaps, and rotatably secured to the base with a retaining ring. A circuit board is received in the housing and has one or more light members, a casing is received in the housing to receive one or more batteries which may energize the light members. The base includes one or more spring blades to engage with the housing, and to retain the housing to the base at selected angular position. A cap is rotatably secured to the casing, and includes one or more latches to detachably engage with the housing.

14 Claims, 11 Drawing Sheets

LIGHT DEVICE FOR ATTACHING TO VARIOUS OBJECTS

BACKGROUND OF THE INVENTION

1. Field of the Invention

The present invention relates to a light device, and more particularly to a light device for attaching to various objects.

2. Description of the Prior Art

Various kinds of typical light devices have been developed, and comprise one or more fasteners for solidly attaching onto various objects, such as front handle bars of cycles. The typical light devices are solidly secured to the cycles and may not be easily disengaged from the cycles, and thus may not be easily attached onto the other objects, such as the heads of the users.

The other typical fight devices may comprise a fastener strap provided thereon for attaching the typical light devices onto such as the heads of the users.

However, normally, the typical light devices comprise a light bulb fixedly attached to the objects, and may not be easily adjusted to different angular directions, such that the typical light devices may not be used to suitably light the environment.

The present invention has arisen to mitigate and/or obviate the afore-described disadvantages of the conventional light devices.

SUMMARY OF THE INVENTION

The primary objective of the present invention is to provide a light device including one or more fastener straps provided thereon for attaching the light devices onto various objects, such as the heads of the users, or the cycles, etc.

The other objective of the present invention is to provide a light device including a housing rotatable or adjustable to different angular positions, for suitably lighting the environment.

In accordance with one aspect of the invention, there is provided a light device comprising a base including a first flap and a second flap extended therefrom and spaced away from each other, the second flap including an opening formed therein, a housing rotatably disposed between the first and the second flaps, and including a bore formed therein and aligned with the opening of the second flap of the base, and including a chamber formed therein, a circuit board received in the chamber of the housing, at least one light member attached to the circuit board, a casing received in the bore of the housing, and including at least one space formed therein, at least one battery received in the space of the casing, and electrically coupled to the circuit board, to energize the light member, at least one retaining ring engaged onto the housing, and attached to the base, to rotatably secure the housing to the base. The base includes at least one spring blade extended therefrom to engage with the housing, and to retain the housing to the base at selected angular position.

The retaining ring includes a first end having a hook engaged into the housing, and a second end, and at least one fastener engaged through the base and engaged with the second end of the retaining ring, to secure the retaining ring to the base, and to rotatably secure the housing to the base.

The retaining ring includes a channel formed therein, and the housing includes a projection extended therefrom and slidably engaged in the channel of the retaining ring, to limit a rotational movement of the housing relative to the base.

The housing includes at least one recessed shoulder formed therein to receive the retaining ring, and to position the retaining ring relative to the housing.

The casing includes a first end, and a cap rotatably secured to the first end of the casing, and the cap includes at least one latch extended therefrom to engage with the housing, and to detachably secure the cap and the casing to the housing.

The casing includes a peripheral depression formed in the first end thereof, the cap includes a ring member secured thereto and having at least one projection extended therefrom to engage into the peripheral depression of the casing, and to secure the cap to the casing.

The housing includes at least one lock notch formed therein to receive the latch of the cap, and to detachably secure the cap to the housing, the cap includes an engaging recess formed therein, for receiving driving tools.

The housing includes an outer peripheral portion having a plurality of teeth formed thereon, and the spring blade of the base includes at least one tooth provided thereon to engage with the teeth of the housing, and to position the housing to the base at selected angular positions.

The casing includes at least one groove formed therein, the housing includes at least one rib extended therefrom, and engaged into the groove of the casing, to prevent the casing from being rotated relative to the housing.

The housing includes at least one guide fin extended into the bore thereof, a conduit is received in the bore of the housing and includes at least one slot formed therein, to slidably receive the guide fin of the housing, and to position the conduit to the housing, and to prevent the conduit from being rotated relative to the housing.

The casing includes a stop extended therefrom, a spring is engaged between the stop of the casing and the conduit, to bias the casing out of the bore of the housing.

The housing includes at least one peg extended into the chamber thereof, the circuit board includes at least one notch formed therein to receive the peg of the housing, and to position the circuit board in the housing, a reflector is received in the chamber of the housing and includes at least one notch formed therein to receive the peg of the housing, and to position the reflector in the housing, the reflector includes at least one orifice formed therein to receive the light member.

The housing further includes a cover having at lest one hole formed therein, and at least one fastener engaged through the hole of the cover and engaged to the peg of the housing, and to secure the cover to the housing.

The cover includes at least one lock opening formed therein, a frame is attached onto the cover, and includes at least one catch extended therefrom, to engage into the lock opening of the cover, and to secure the frame onto the cover.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 13:
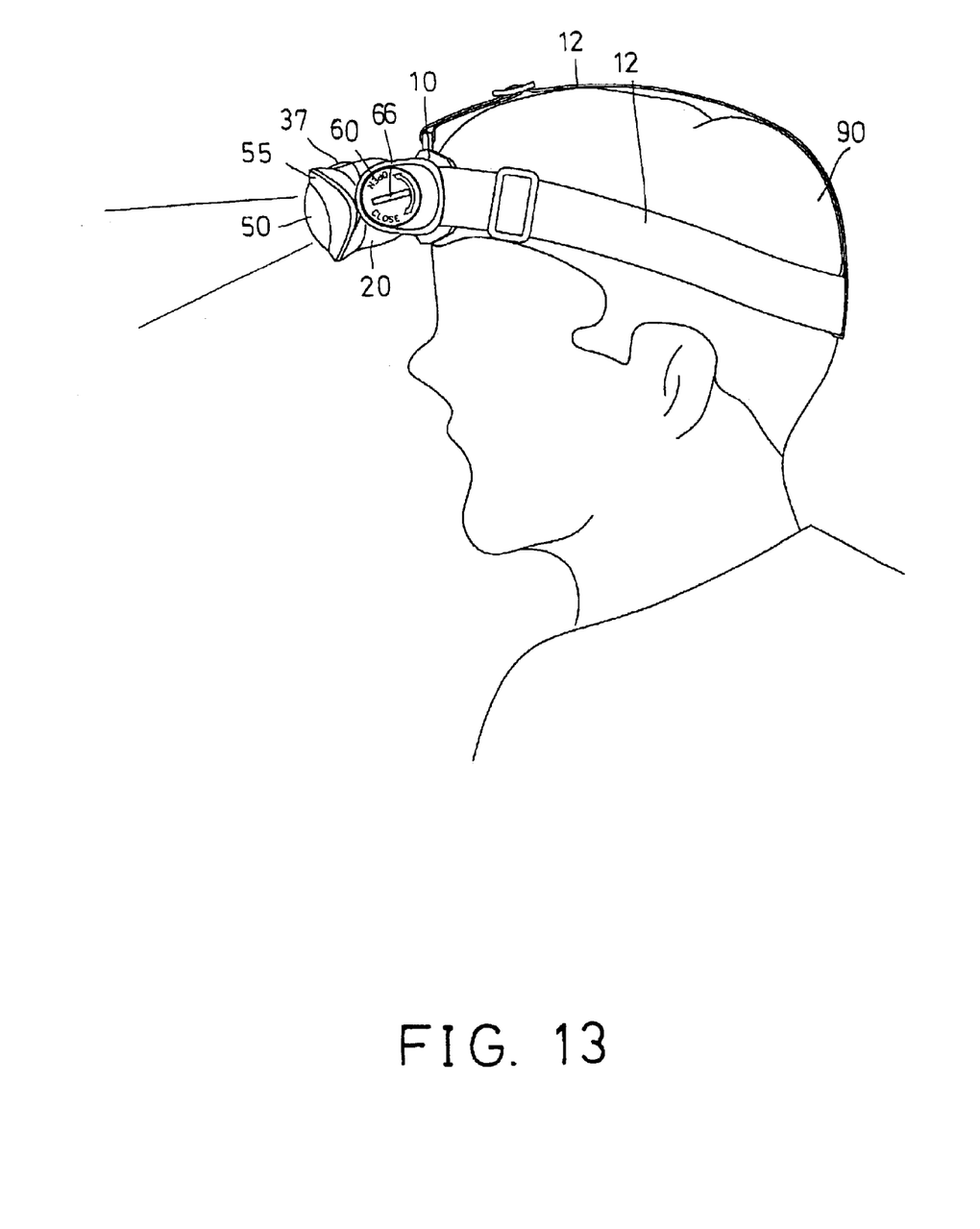
FIG. 13 is a side schematic view illustrating the operation of the light device.

Referring to the drawings, and initially to FIGS. 1–7, a light device in accordance with the present invention comprises a base 10 including one or more ears 11 provided thereon, for attaching one or more fastener straps 12 thereto, and for attaching the base 10 of the light device onto various objects, such as the head 90 of the user (FIG. 13). One or more cushioning pads 13 may be attached onto the base 10 (FIGS. 2, 5), for comfortably engaging with the head 90 of the user.

The base 10 includes two flaps 14, 15 extended forwardly therefrom and spaced away from each other. One of the flaps 15 includes an opening 16 formed therein. The base 10 further includes one or more, such as two pairs of passages 17 formed therein and located beside the flaps 14, 15 respectively (FIGS. 2, 9, 10), and includes one or more, such as two spring blades 18 extended therefrom, and located between the flaps 14, 15, and each having one or more teeth 19 provided thereon.

A housing 20 is disposed between the flaps 14, 15 of the base 10, and includes two ends each having a recessed shoulder 21 formed therein. One or more, such as two retaining rings 30 are engaged onto the recessed shoulders 21 of the housing 20, and each may include a hook 31 extended or provided on one end thereof to engage into one of the passages 17 of the base 10, and may include a stud 32 extended or provided on the other end thereof to engage into the other passages 17 of the base 10, and secured to the base 10 with one or more fasteners 33 (FIGS. 2, 9, 10).

Figure 1:
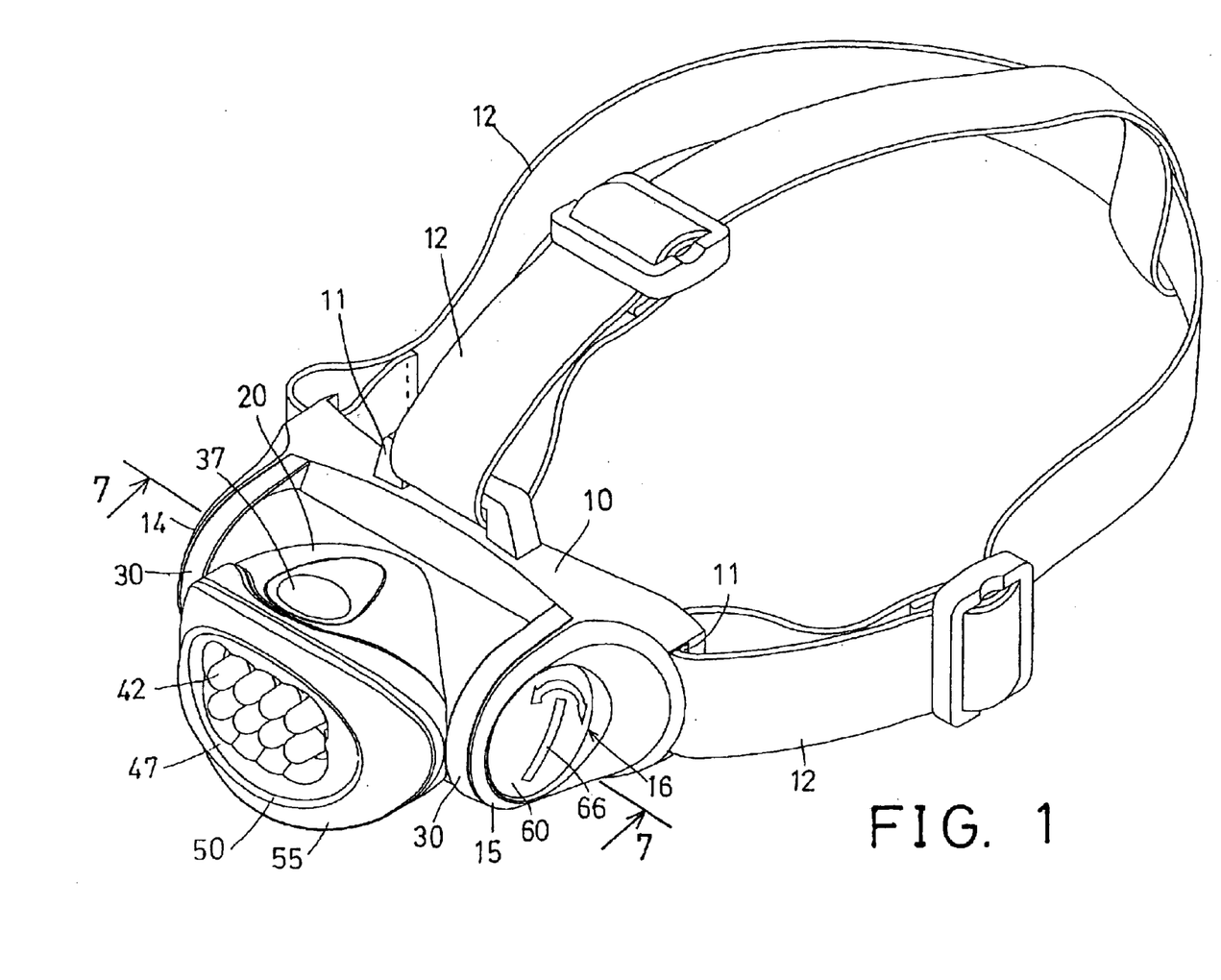
FIG. 1 is a perspective view of a light device in accordance with the present invention.
Figure 2:
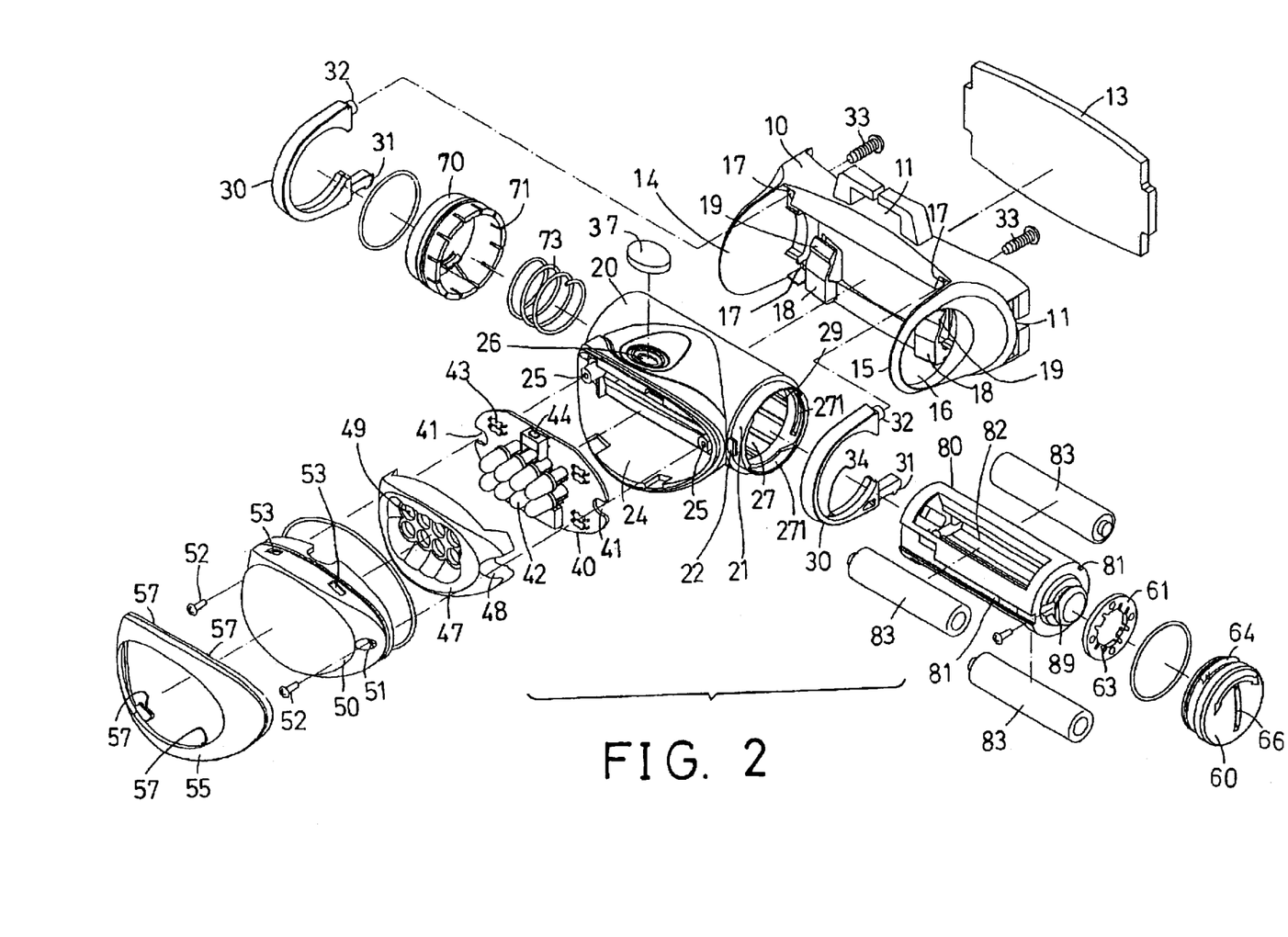
FIG. 2 is an exploded view of the light device.
Figure 3:
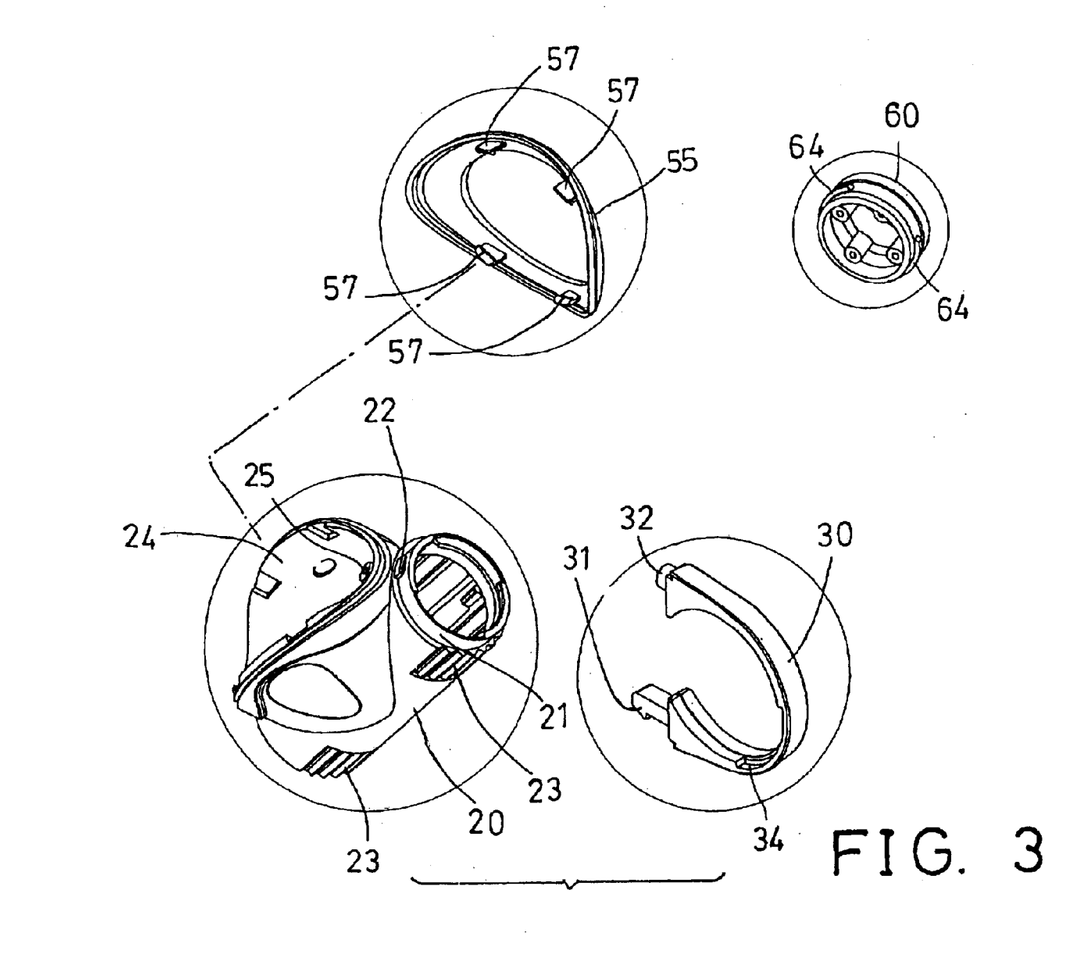
FIG. 3 is a partial exploded view of the light device, illustrating some of the elements as seen from the opposite direction from that shown in FIG. 2.
Figure 4:
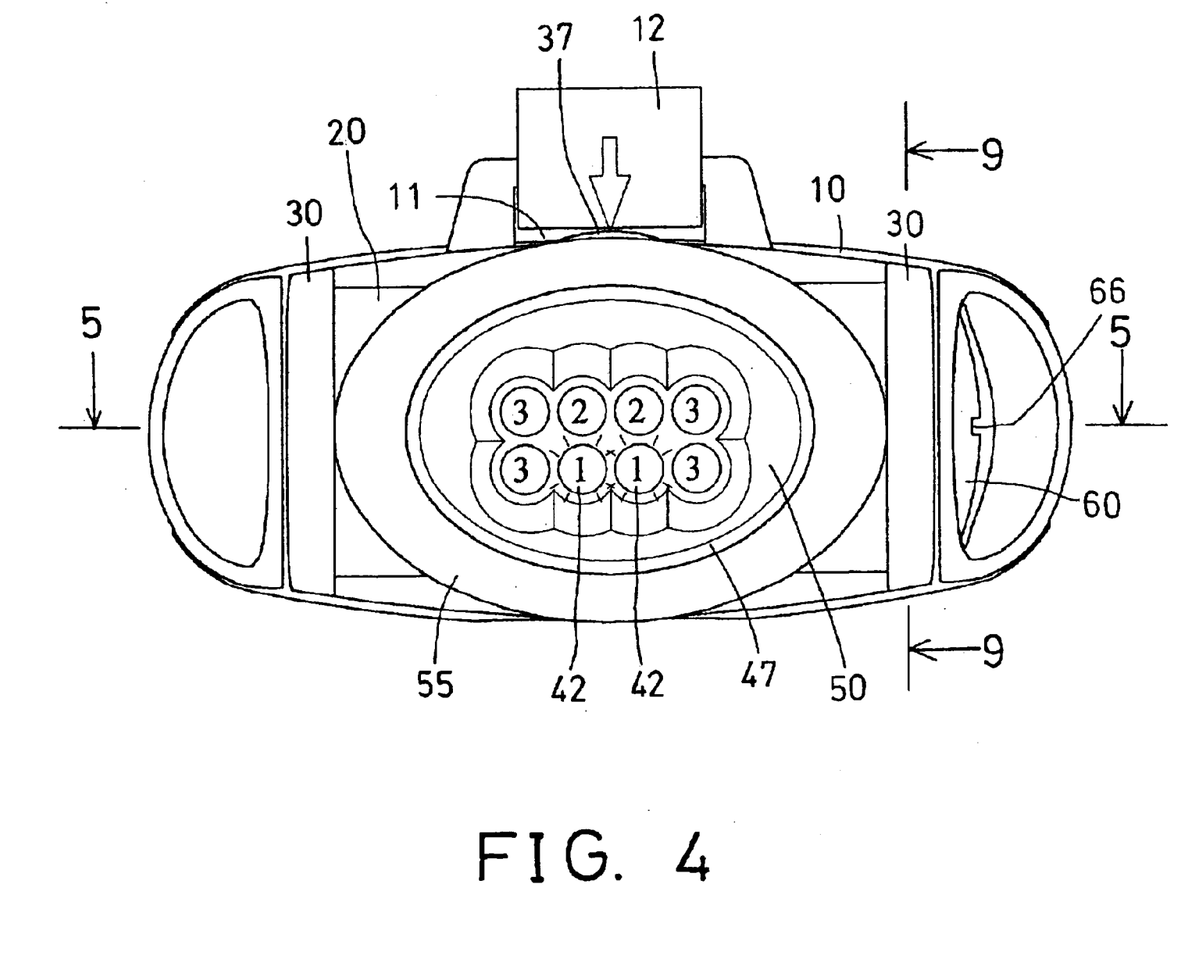
FIG. 4 is a front plan view of the light device.
Figure 9:
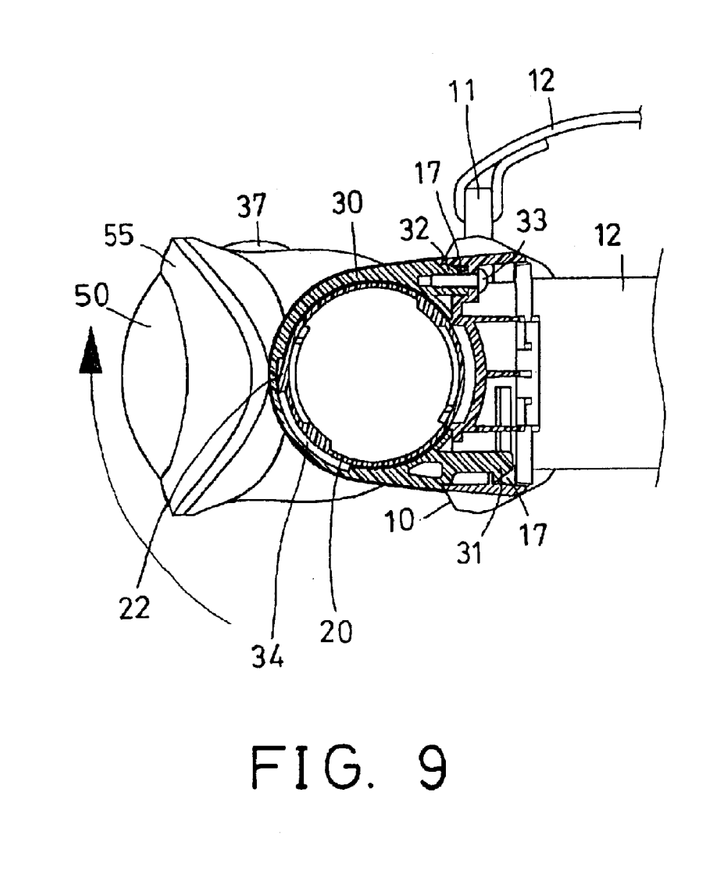
FIG. 9 is a partial cross sectional view taken along lines 9—9 of FIG. 4.
Figure 10:
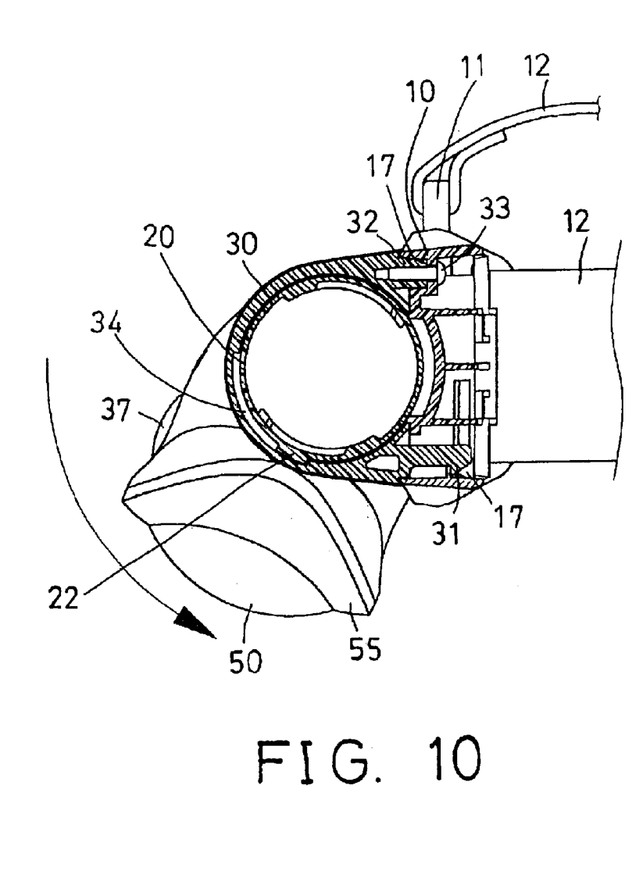
FIG. 10 is a partial cross sectional view similar to FIG. 9, illustrating the operation of the light device.

As also shown in FIGS. 2, 9, 10, one or both of the retaining rings 30 may each include a channel 34 formed therein, and the housing 20 may include one or more projections 22 extended therefrom and slidably engaged in the channel 34 of the retaining ring 30, to guide the housing 20 to rotate relative to the base 10, and to limit the rotational movement of the housing 20 relative to the base 10.

Figure 11:
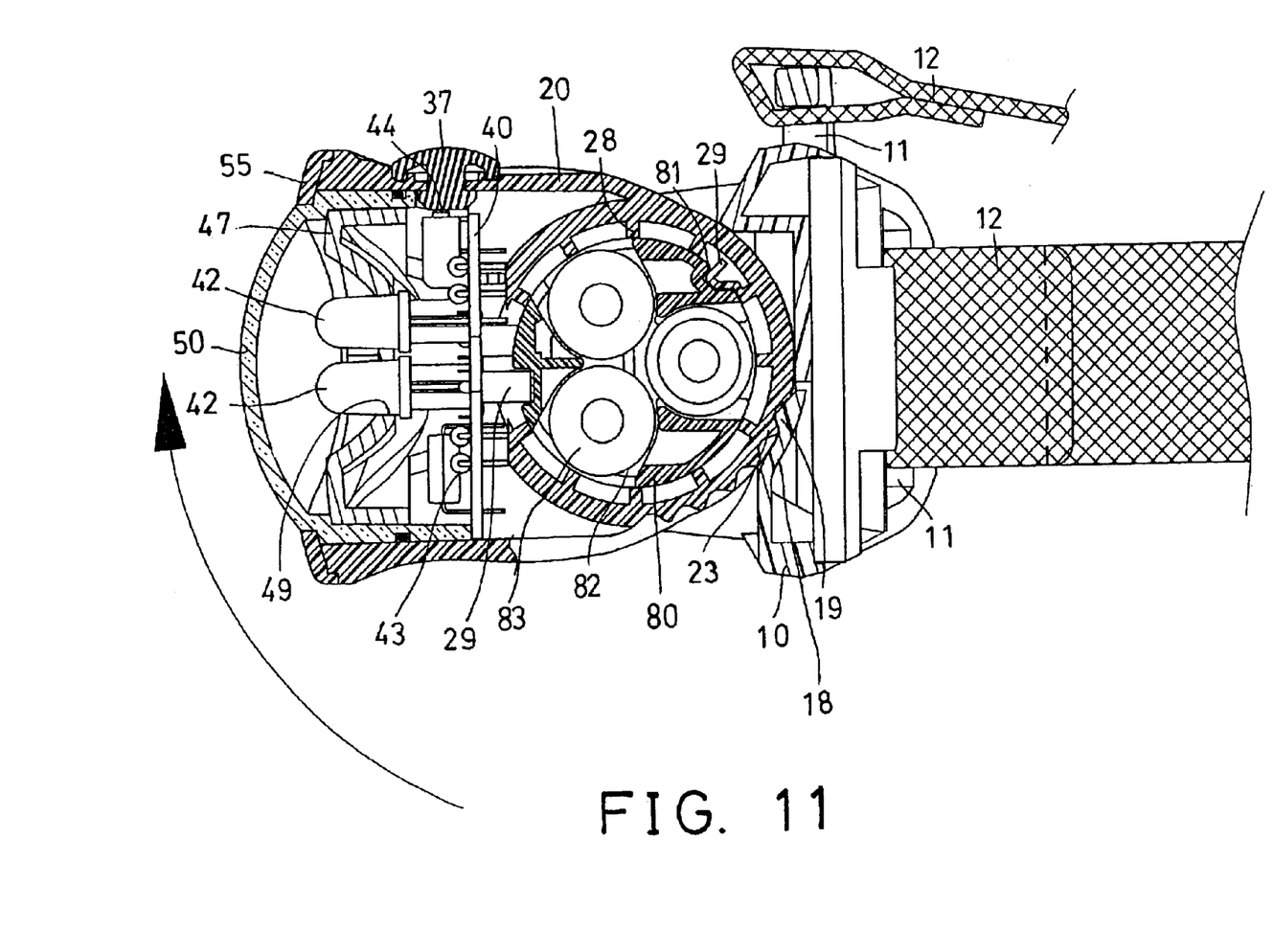
FIGS. 11, 12 are partial cross sectional views similar to FIG. 6, illustrating the operation of the light device.
Figure 12:
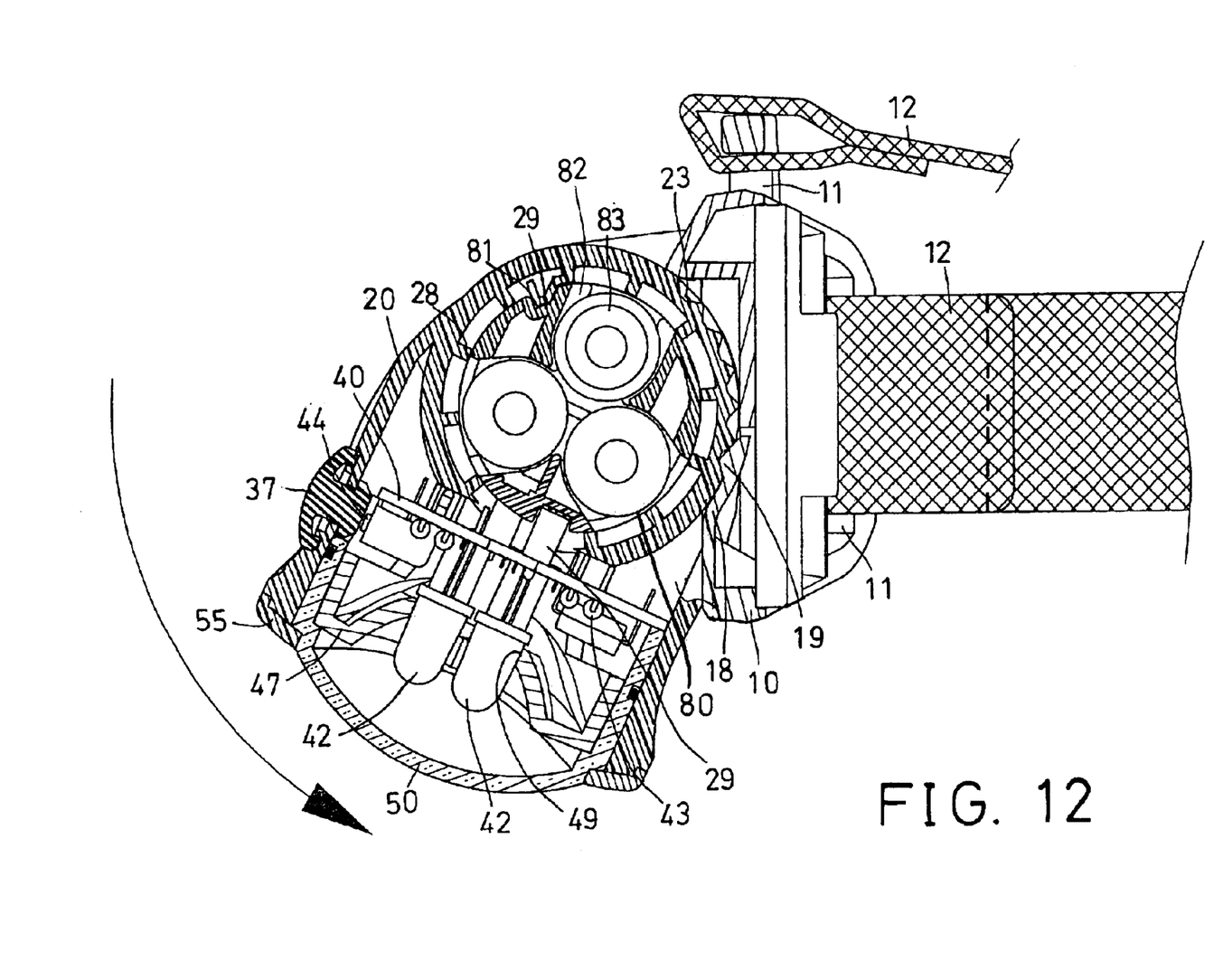

The housing 20 includes a number of depressions or teeth 23 formed on the outer peripheral portion thereof (FIGS. 3, 11, 12), for engaging with the teeth 19 of the spring blades 18 of the base 10, and for positioning the housing 20 to the base 10 at any selected or suitable angular positions, best shown in FIGS. 11, 12. The housing 20 may thus be rotated or adjusted relative to the base 10 to any selected or suitable angular positions by the engagement of the spring blades 18 of the base 10 to the housing 20.

Figure 6:
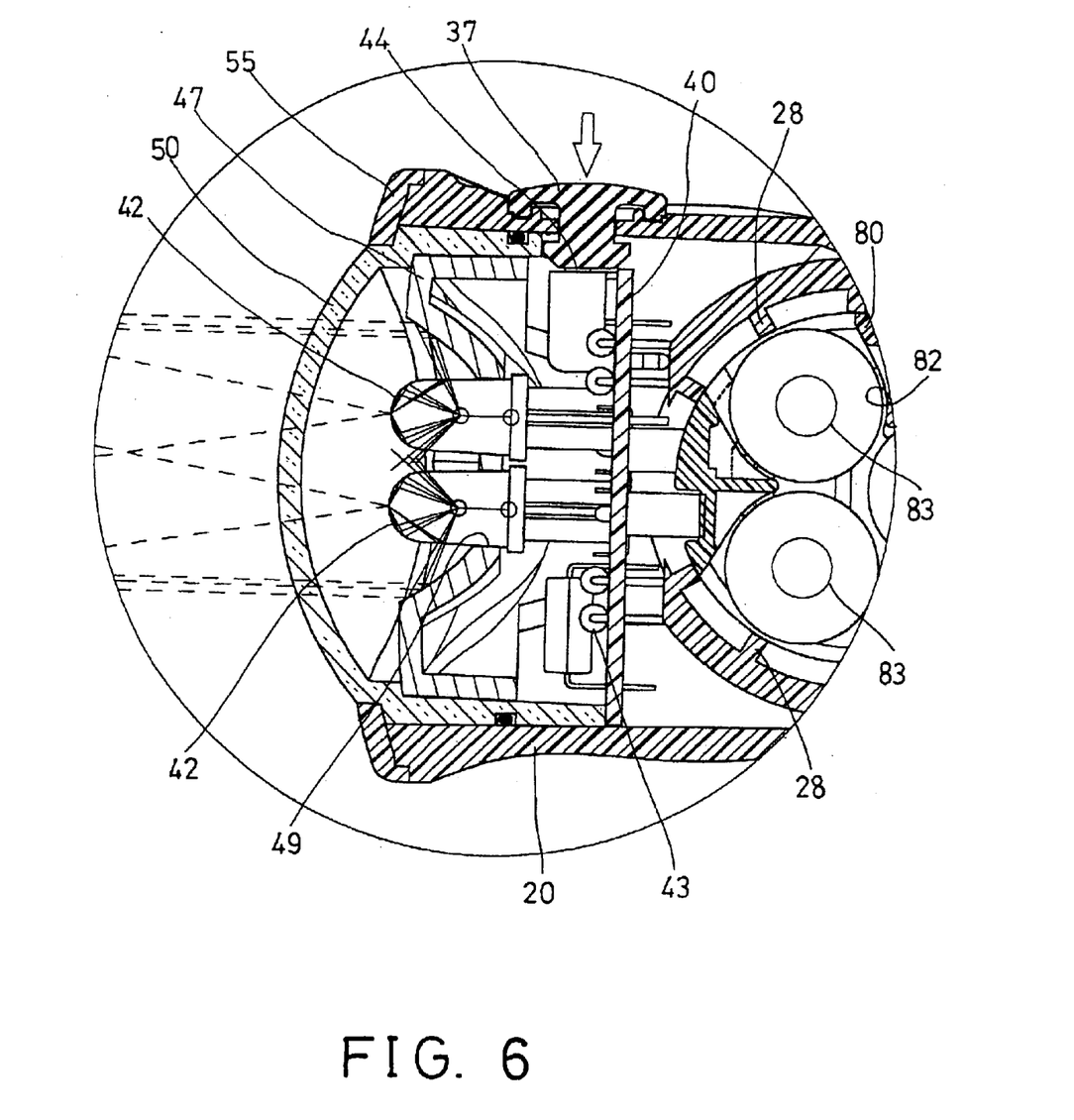
FIG. 6 is an enlarged partial cross sectional view taken along lines 6—6 of FIG. 5.
Figure 7:
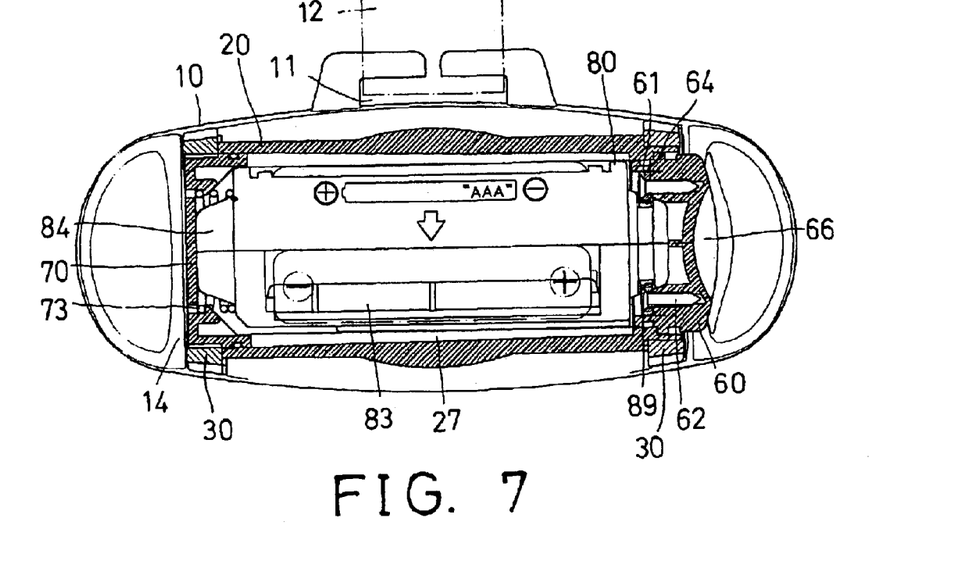
FIG. 7 is a partial cross sectional view taken along lines 7—7 of FIG. 1.

The housing 20 includes a chamber 24 formed in the front portion thereof, and includes one or more pegs 25 extended into the chamber 24 thereof, and includes an orifice 26 formed therein (FIG. 2) and communicating with the chamber 24 thereof, to slidably receive a button 37 therein (FIGS. 6, 11, 12).

A circuit board 40 is received in the chamber 24 of the housing 20, and includes one or more notches 41 formed therein, to receive the pegs 25 of the housing 20, and to position the circuit board 40 to the housing 20. The circuit board 40 includes one or more light members 42 provided thereon, such as light bulbs, light emitting diodes, etc., and includes one or more electric elements 43 attached thereto.

Figure 5:
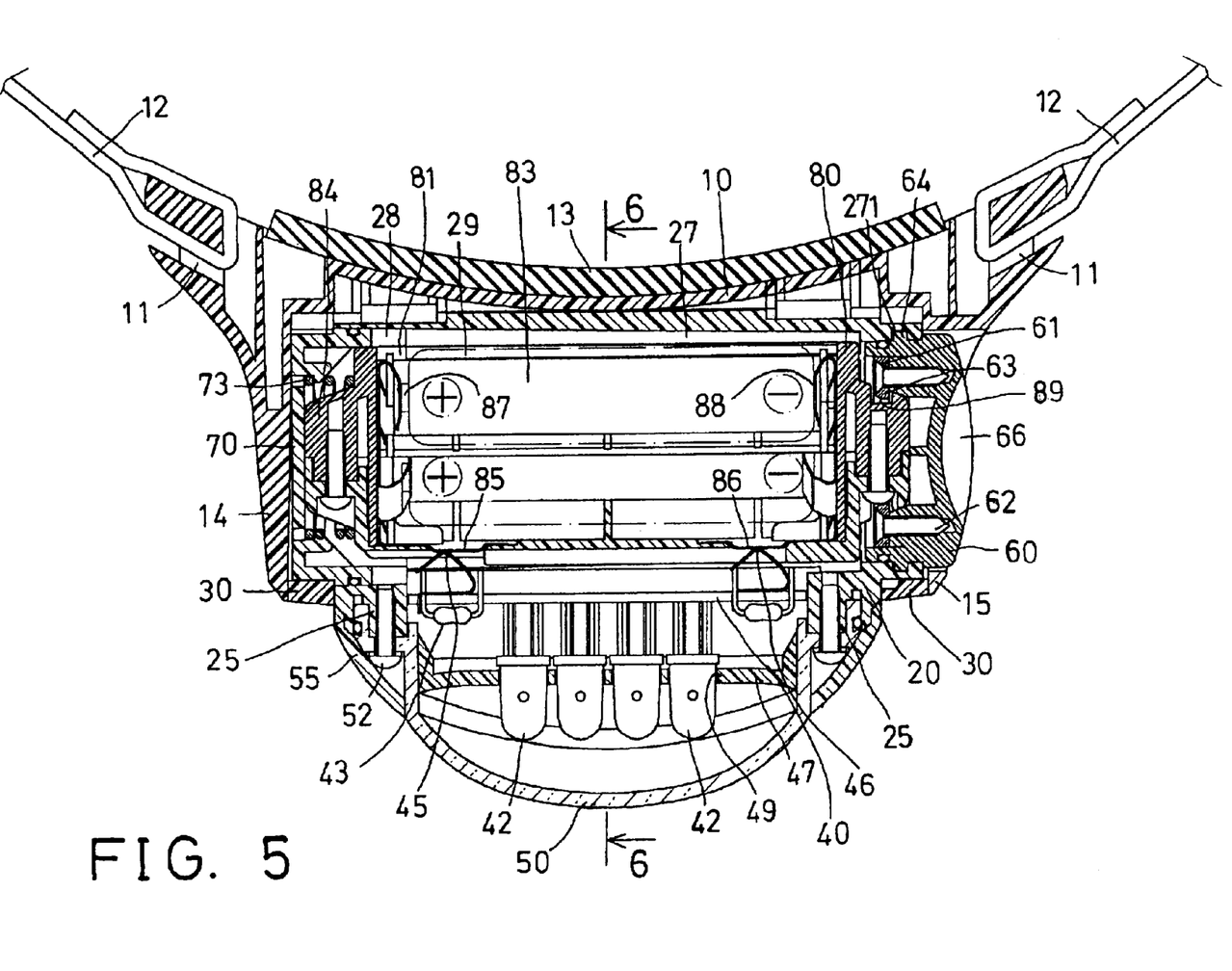
FIG. 5 is a partial cross sectional view taken along lines 5—5 of FIG. 4.

The circuit board 40 includes a switch 44 provided thereon and aligned with the button 37, for being depressed or actuated by the button 37 (FIGS. 6, 11, 12), in order to switch on and off the light members 42. The circuit board 40 further includes two conductors or terminals 45, 46 provided thereon (FIG. 5).

A reflector 47 is also received in the chamber 24 of the housing 20, and includes one or more notches 48 formed therein, to receive the pegs 25 of the housing 20, and to position the reflector 47 to the housing 20. The reflector 47 includes one or more orifices 49 formed therein to slidably receive the light members 42 respectively, and to reflect the light generated by the light members 42.

A transparent or semi-transparent cover 50 is also received in the chamber 24 of the housing 20, and attached onto the reflector 47, and includes one or more holes 51 formed therein, to receive fasteners 52 therein. The fasteners 52 may be engaged with the pegs 25 of the housing 20, to solidly secure the cover 50 and the reflector 47 and the circuit board 40 in the chamber 24 of the housing 20.

The cover 50 further includes one or more lock openings 53 formed therein. A frame 55 is attached onto the outer peripheral portion of the cover 50, and includes one or more catches 57 extended rearwardly therefrom, to engage into the lock openings 53 of the cover 50, and to secure the frame 55 onto the outer peripheral portion of the cover 50, and thus to protect the cover 50.

The housing 20 includes one or more guide fins 28 extended into one end thereof (FIGS. 5, 6, 8, 11, 12). A conduit 70 is received in one end of the housing 20, and includes one or more slots 71 formed therein, to slidably receive the guide fins 28 of the housing 20, and to position the conduit 70 to the housing 20, and thus to prevent the conduit 70 from being rotated relative to the housing 20. A spring 73 is received in the conduit 70.

The housing 20 includes a bore 27 formed therein and aligned with the opening 16 of the flap 15, and includes one or more ribs 29 extended into the bore 27 thereof (FIGS. 2, 11, 12). A casing 80 is received in the bore 27 of the housing 20, and includes one or more grooves 81 formed therein, to slidably receive the ribs 29 of the housing 20, and to prevent the casing 80 from being rotated relative to the housing 20. The casing 80 includes one or more spaces 82 formed therein each of which may be used to receive a battery 83 therein.

The casing 80 includes a stop 84 extended from one end thereof (FIGS. 7, 8), to engage with the spring 73, and to stably position the spring 73 between the conduit 70 and the casing 80; and includes two conductors or terminals 85, 86 provided thereon (FIG. 5) and coupled to the central electrode 87 and the case electrode 88 of the batteries 83 respectively, for electrically coupling to the terminals 45, 46 of the circuit board 40 respectively (FIG. 5) when the casing 80 is forced into the bore 27 of the housing 20, and to energize the light members 42.

The casing 80 includes a peripheral depression 89 formed in the other end thereof (FIG. 2). A cap 60 includes a ring member 61 secured to the inner portion thereof with one or more fasteners 62 (FIGS. 5, 7, 8), and the ring member 61 includes one or more projections 63 extended therefrom for engaging into the peripheral depression 89 of the casing 80, and thus for securing the cap 60 to the casing 80.

Figure 8:
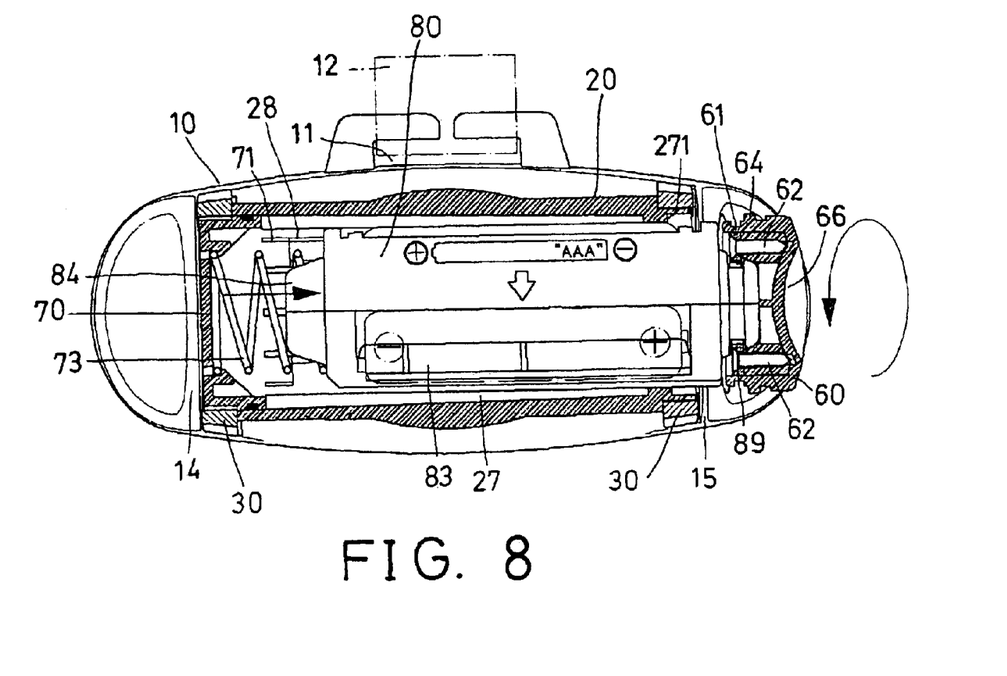
FIG. 8 is a partial cross sectional view similar to FIG. 7, illustrating the operation of the light device.

The housing 20 includes one or more lock notches 271 formed in the other end thereof (FIGS. 2, 5, 8). The cap 60 includes one or more latches 64 extended outwardly therefrom for engaging into the corresponding lock notches 271 of the housing 20, and for detachably securing the cap 60 and thus the casing 80 to the housing 20. The cap 60 includes an engaging recess 66 formed therein, to receive driving tools (not shown) which may be used to rotate the cap 60 relative to the housing 20, to lock and unlock the cap 60 from the housing 20.

In operation, the housing 20 may be rotatably secured to the base with one or more retaining rings 30, for allowing the housing 20 to be rotated or adjusted relative to the base 10. The base 10 includes one or more spring blades 18 for engaging with the housing 20, in order to secure and retain the housing 20 to the base 10 at suitable or selected angular positions, and so as to direct the light members 42 toward various angular positions relative to the base 10.

The cap 60 may be rotatably attached to the casing 80 with the projections 63 of the ring member 61, for moving the casing 80 into and out of the bore 27 of the housing 20, and the cap 60 includes one or more latches 64 extended outwardly therefrom for engaging into the corresponding lock notches 271 of the housing 20, and for detachably securing the cap 60 and thus the casing 80 to the housing 20.

The casing 80 may be guided to slide relative to the housing 20 by the sliding engagement of the ribs 29 of the housing 20 in the grooves 81 of the casing 80, in order to prevent the casing 80 from being rotated relative to the housing 20, and so as to suitably and electrically coupling the conductors or terminals 85, 86 of the casing 80 with the terminals 45, 46 of the circuit board 40 respectively (FIG. 5), in which the terminals 85, 86 of the casing 80 are electrically coupled with the central electrode 87 and the case electrode 88 of the batteries 83 respectively.

Accordingly, the light device in accordance with the present invention includes one or more fastener straps provided thereon for attaching the light devices onto various objects, such as the heads of the users, or the cycles, etc., and includes a housing rotatable or adjustable to different angular positions, for suitably lighting the environment.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A light device comprising:
a base including a first flap and a second flap extended therefrom and spaced away from each other, said second flap including an opening formed therein,
a housing rotatably disposed between said first and said second flaps, and including a bore formed therein and aligned with said opening of said second flap of said base, and including a chamber formed therein,
a circuit board received in said chamber of said housing,
at least one light member attached to said circuit board,
a casing received in said bore of said housing, and including at least one space formed therein,
at least one battery received in said at least one space of said casing, and electrically coupled to said circuit board, to energize said at least one light member,
at least one retaining ring engaged onto said housing, and attached to said base, to rotatably secure said housing to said base, and
said base including at least one spring blade extended therefrom to engage with said housing, and to retain said housing to said base at selected angular position.

2. The light device as claimed in claim 1, wherein said at least one retaining ring includes a first end having a hook engaged into said base, and a second end, and at least one fastener engaged through said base and engaged with said second end of said at least one retaining ring, to secure said at least one retaining ring to said base, and to rotatably secure said housing to said base.

3. The light device as claimed in claim 1, wherein said at least one retaining ring includes a channel formed therein, and said housing includes a projection extended therefrom and slidably engaged in said channel of said at least one retaining ring, to limit a rotational movement of said housing relative to said base.

4. The light device as claimed in claim 1, wherein said housing includes at least one recessed shoulder formed therein to receive said at least one retaining ring, and to position said at least one retaining ring relative to said housing.

5. The light device as claimed in claim 1, wherein said casing includes a first end, and a cap rotatably secured to said first end of said casing, and said cap includes at least one latch extended therefrom to engage with said housing, and to detachably secure said cap and said casing to said housing.

6. The light device as claimed in claim 5, wherein said casing includes a peripheral depression formed in said first end thereof, said cap includes a ring member secured thereto and having at least one projection extended therefrom to engage into said peripheral depression of said casing, and to secure said cap to said casing.

7. The light device as claimed in claim 5, wherein said housing includes at least one lock notch formed therein to receive said at least one latch of said cap, and to detachably secure said cap to said housing, said cap includes an engaging recess formed therein, for receiving driving tools.

8. The light device as claimed in claim 1, wherein said housing includes an outer peripheral portion having a plurality of teeth formed thereon, and said at least one spring blade of said base includes at least one tooth provided thereon to engage with said teeth of said housing, and to position said housing to said base at selected angular positions.

9. The light device as claimed in claim 1, wherein said casing includes at least one groove formed therein, said housing includes at least one rib extended therefrom, and engaged into said at least one groove of said casing, to prevent said casing from being rotated relative to said housing.

10. The light device as claimed in claim 1, wherein said housing includes at least one guide fin extended into said bore thereof, a conduit is received in said bore of said housing and includes at least one slot formed therein, to slidably receive said at least one guide fin of said housing, and to position said conduit to said housing, and to prevent said conduit from being rotated relative to said housing.

11. The light device as claimed in claim 10, wherein said casing includes a stop extended therefrom, a spring is engaged between said stop of said casing and said conduit, to bias said casing out of said bore of said housing.

12. The light device as claimed in claim 1, wherein said housing includes at least one peg extended into said chamber thereof, said circuit board includes at least one notch formed therein to receive said at least one peg of said housing, and to position said circuit board in said housing, a reflector is received in said chamber of said housing and includes at least one notch formed therein to receive said at least one peg of said housing, and to position said reflector in said housing, said reflector includes at least one orifice formed therein to receive said at least one light member.

13. The light device as claimed in claim 12, wherein said housing further includes a cover having at least one hole formed therein, and at least one fastener engaged through said at least one hole of said cover and engaged to said at least one peg of said housing, and to secure said cover to said housing.

14. The light device as claimed in claim 13, wherein said cover includes at least one lock opening formed therein, a frame is attached onto said cover, and includes at least one catch extended therefrom, to engage into said at least one lock opening of said cover, and to secure said frame onto said cover.

\* \* \* \* \*